(12) United States Patent
Kuiper et al.

(10) Patent No.: US 7,553,019 B2
(45) Date of Patent: *Jun. 30, 2009

(54) VARIABLE FOCUS SPECTACLES

(75) Inventors: Stein Kuiper, Eindhoven (NL); Bernardus Hendrikus Wilhelmus Hendriks, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 381 days.

This patent is subject to a terminal disclaimer.

(21) Appl. No.: 10/563,841

(22) PCT Filed: Jul. 1, 2004

(86) PCT No.: PCT/IB2004/051079

§ 371 (c)(1),
(2), (4) Date: Jan. 5, 2006

(87) PCT Pub. No.: WO2005/003842

PCT Pub. Date: Jan. 13, 2005

(65) Prior Publication Data

US 2006/0244902 A1 Nov. 2, 2006

(30) Foreign Application Priority Data

Jul. 8, 2003 (EP) .................. 03102047

(51) Int. Cl.
*G02C 7/06* (2006.01)
*G02B 1/06* (2006.01)
(52) U.S. Cl. .............. 351/168; 351/161; 351/172; 359/665; 359/666
(58) Field of Classification Search .......... 351/159, 351/168; 359/665, 666
See application file for complete search history.

(56) References Cited

U.S. PATENT DOCUMENTS

| 4,756,605 | A | * | 7/1988 | Okada et al. ............... 349/13 |
| 5,182,585 | A | | 1/1993 | Stoner |
| 6,318,857 | B1 | | 11/2001 | Shirayanagi |
| 6,369,954 | B1 | | 4/2002 | Berge et al. |
| 6,449,081 | B1 | | 9/2002 | Onuki et al. |
| 7,245,439 | B2 | * | 7/2007 | Kuiper et al. ............ 359/665 |
| 7,311,398 | B2 | * | 12/2007 | Kuiper et al. ............ 351/161 |

FOREIGN PATENT DOCUMENTS

| DE | 4217853 A | 12/1993 |
| JP | 2002249282 A | 9/2001 |
| WO | 9961940 A1 | 12/1999 |
| WO | 0058763 A1 | 10/2000 |
| WO | 0102896 A1 | 1/2001 |
| WO | 0122148 A1 | 3/2001 |
| WO | 02063353 A2 | 8/2002 |
| WO | 02065197 A2 | 8/2002 |
| WO | 2004049927 A1 | 6/2004 |

* cited by examiner

*Primary Examiner*—Scott J Sugarman

(57) ABSTRACT

The invention concerns variable focus spectacles in which the electro-wetting effect is utilized to provide a manually or automatically variable focal length. The variable focus spectacles (200) comprise a spectacle frame (210) and at least one variable power lens (100A, 100B). The lens (100) comprises a transparent rear wall (110), a transparent front wall (120), a cavity (140) formed between the transparent front wall (120) and the transparent rear wall (110), first and second immiscible fluids of differing refractive index contained within said cavity, and electrodes (150, 160) for applying an electric field to said fluids to change a contact angle between an interface layer (M) of the two fluids and the front wall of the lens.

14 Claims, 4 Drawing Sheets

VARIABLE FOCUS SPECTACLES

Related application are U.S. Ser. No. 10/598,258 filed Feb. 28, 2005, which issued Dec. 25, 2007 as U.S. Pat. No. 7,311, 398, and U.S. Ser. No. 10/563,842, filed Jan. 5, 2006.

The present invention relates to variable focus spectacles and lenses for them.

Many people suffer from myopia. Often, as people get older they start suffering from hyperopia as well. A common solution for this problem is to wear varifocus glasses in which the focal length of a lens changes from top to bottom. However, many people do not like wearing such glasses, preferring instead to have separate pairs.

Naturally, it is inconvenient to need to switch between different pairs of glasses and, clearly, the currently available varifocus lenses do not meet with universal approval. They are often found to be irritating to the user, since it may be necessary to change the way that the user views an object (e.g. tilting the head) in order to view the object through an appropriate part of the varifocus lens.

It is an aim of embodiments of the present invention to provide variable focus lenses suitable for use in glasses and to provide glasses incorporating such lenses.

According to the invention, there are provided variable focus spectacles comprising a spectacle frame and at least one variable power lens, wherein said lens comprises a transparent rear wall, a transparent front wall, a cavity formed between the transparent front wall and the transparent rear wall, first and second immiscible fluids of differing refractive index contained within said cavity, and electrodes to which a potential difference may be applied to change a contact angle between an interface layer of the two fluids and the front wall of the lens.

Spectacles as formed above enable the user to have adaptive eyesight correction in a single pair of spectacles, avoiding the necessity for changing pairs and further allowing such correction to occur within an extended field of view as compared to known varifocus (bifocal) lenses.

Preferably, the transparent front wall joins with the transparent rear wall at peripheral regions thereof to form an acute internal angle at their joining region. Such a construction facilitating the provision of relatively thin lenses.

Preferably, the first and second fluids are of substantially identical specific gravity. In this manner an interface free from gravitational variations is provided.

Preferably, the electrodes comprise a ring-type electrode which extends around an internal periphery of the transparent front wall, so as to form a first electrical contact and a further electrode adjacent an internal surface of the rear wall.

Preferably the ring-type electrode is coated with an insulator and does not make direct contact with either fluid. The further electrode preferably is arranged to make direct or capacitively coupled contact with the second fluid. In the case where the second fluid comprises water, the insulator is preferably hydrophobic to avoid problems caused by water molecules sticking to the ring-type electrode.

Preferably, the first fluid is the fluid nearest the transparent front wall, whilst the second fluid is the fluid having a boundary with the transparent rear wall and the first fluid comprises a substantially non-conductive fluid, further referred to as an oil, whilst the second fluid comprises a substantially conducting and or polar fluid, further referred to as an electrolyte.

Preferably, the second fluid comprises a water/salt mixture having a refractive index different to the refractive index of the first fluid.

The variable focus spectacles may further comprise adjustment means for adjusting the strength of an electric field to be applied between the electrodes. Such adjustment means allows a user to vary at will the strength of correction.

Preferably, the adjustment means comprises manual adjustment means and may comprise a variable resistor.

The adjustment means may comprise automatic adjustment means for varying the focal length of the spectacles dependent upon a perceived distance of an object to be viewed. Such automatic adjustment means may comprise a focal length determiner, a control unit and a power supply V, wherein a range finding signal from the focal length determiner is processed by the control unit to determine the desired focal length of the glasses and an appropriate output signal is passed to the electrodes to bring about auto-focusing. Such an automatic system has advantages in that it may free the user from the need to manually adjust the lenses whenever a variation in eyesight correction is desired.

Preferably, the focal length determiner comprises a transducer mounted on the spectacle frame.

The spectacles may further comprise lens strength determining means for measuring the strength of the lenses.

For a better understanding of the invention, and to show how embodiments of the same may be carried into effect, reference will now be made, by way of example, to the accompanying diagrammatic drawings in which.

Figure 1:
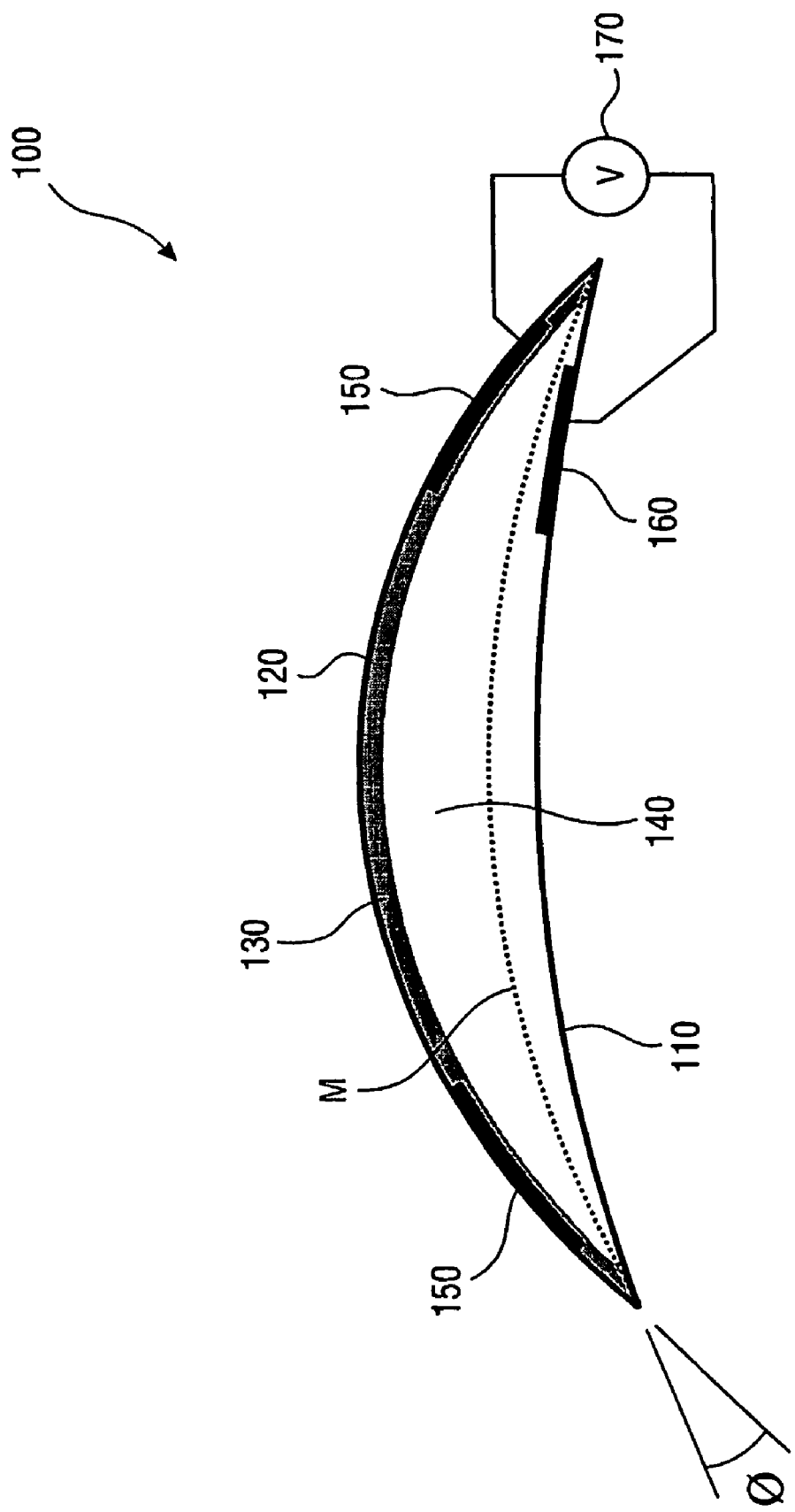
FIG. 1 shows schematically a variable focus lens according to an embodiment of the present invention.

Referring to FIG. 1, there is shown a variable focus lens 100 in accordance with an embodiment of the invention.

The variable focus lens 100 comprises a transparent rear wall 110, a transparent front wall 120, a hydrophobic insulator 130, positioned behind the transparent front wall 120, a cavity 140 formed between the transparent rear wall 110 and the hydrophobic insulator 130 within which a pair of fluids (described later) are contained, a ring-type electrode 150 which extends around an internal periphery of the transparent front wall 120, so as to form a first electrical contact, a counter electrode 160 forming a second electrode, and a voltage source 170 for providing a variable voltage between the two electrodes 150, 160.

Here, it should be noted that the electrode 150 is insulated and hydrophobic. The inside of the frontwall 120 does not have to be insulated, but should preferably be hydrophobic in order to prevent that water molecules start sticking to it. This hydrophobic layer 130 on the frontwall 120 may therefore be much thinner than the layer covering the electrode 150.

As mentioned previously, the cavity 140 is filled with first and second fluids. These fluids are immiscible and of different refractive index. A meniscus line M is shown in FIG. 1 denoting the boundary between the first and second fluids. Here, the first fluid is the fluid nearest the transparent front wall, whilst the second fluid is the fluid having a boundary with the transparent rear wall 110. Here, the first fluid may comprise an oil (such as a colorless transparent silicone oil) and the second fluid is an electrolyte such as a water/alcohol/salt mixture having a refractive index less than the refractive index of the first fluid.

In the above construction, it will be appreciated that the transparent front wall 120 and transparent rear wall 110 form, between them, a container. The hydrophobic insulator 130 may form a layer internally of the transparent front wall 120.

The counter electrode 160 is provided within the container, adjacent to an inside wall of the transparent rear wall 110, so as to enable it to contact the second fluid, whilst the wall electrode 150 extends in a ring around the side of the transparent front wall 120.

The transparent rear wall 110 is transparent and may be formed of acrylic resin. Similarly, the transparent front wall 120 may have the same structure. The two electrodes 150, 160 may also be transparent.

The walls 110, 120 may in themselves provide optical power, spherically and/or cylindrically.

The hydrophobic insulator 130 preferably forms a coating which is internal of the transparent front wall 120 and may comprise one of a number of water repellent surfaces.

In accordance with the "electro-wetting" phenomenon, which is well known, applying a voltage between the two electrodes 150, 160 causes the curvature of the meniscus M to change. Changing the curvature of the meniscus M, as described later, effectively changes the focal length of the lens 100. Making the transparent front wall 120 to be curved as shown, and including the wall electrode 150 in a sloping fashion adjacent the transparent front wall 120 enables a very compact structure of variable focus lens 100 to be achieved. Here, the transparent front wall 120 of the lens joins with the transparent rear wall 110 at peripheral regions thereof to form an acute internal angle Ø at their joining region, this angle Ø is preferably in the range of zero to ninety degrees.

Figure 2:
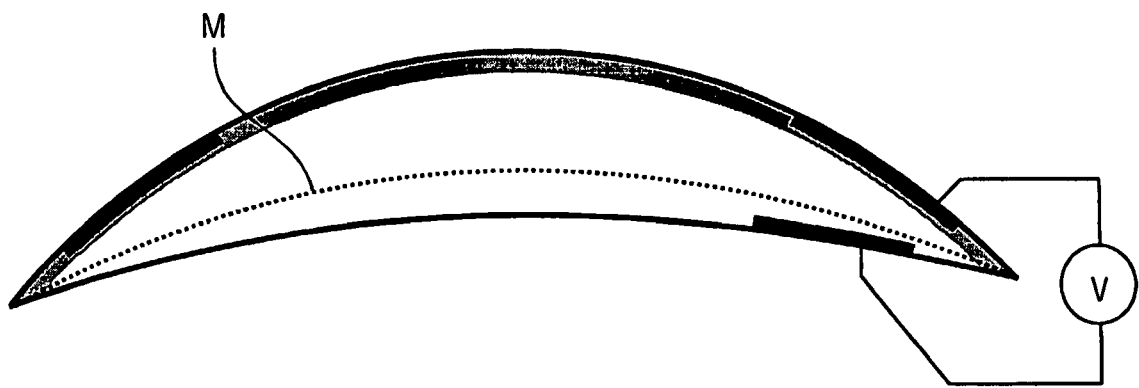
FIG. 2 and FIG. 3 illustrate different states of the lens of FIG. 1.
Figure 3:
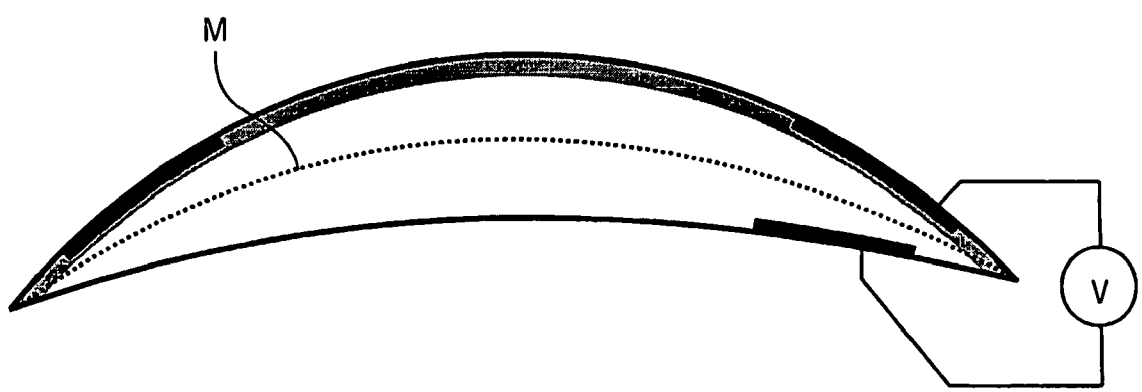

Referring now to FIGS. 2 and 3, there is shown, in practice, how the variable focus lens 100 of FIG. 1 can be arranged to provide variable focusing.

Referring now to FIGS. 2 and 3, there are shown two different configurations of the variable focal length lens of FIG. 1.

FIGS. 2 and 3 have been simplified, to only show the basic shape of the container formed by the transparent front wall 120 and transparent rear wall 110 and the curvature of the meniscus layer M. Here, in the configuration shown in FIG. 1, it is assumed that a minimum or zero voltage is applied to the two electrodes 150, 160 via a voltage source. 170 and that in this low voltage state the meniscus layer M has the curvature shown and which is determined simply by the interfacial, tension between the first and second fluids.

In FIG. 3, an electric field is applied between the two electrodes 150, 160 to change the shape of the boundary between the two fluids. Here, by virtue of the electro-wetting effect, the applied electric field changes the shape of the meniscus M between the two fluids into the shape shown in FIG. 3 and the focal length of the lens shown is thereby changed. In more detail, The applied electric field causes the contact angle between the periphery of the meniscus level and the point at which it touches the ring-type electrode 150 to change. Because of the change in contact angle, the overall shape of the meniscus layer 140 changes curvature.

Whilst in FIG. 3, there is shown to be a degree of change in the diameter, this occurs at the front wall 110 and is outside of the field of view of the user and is only a secondary effect brought about by a change in contact angle of the meniscus layer. In other words, the radius of curvature of the meniscus M decreases and thereby varies the focal length of the lens as a whole and increases the power of the lens.

Figure 4:
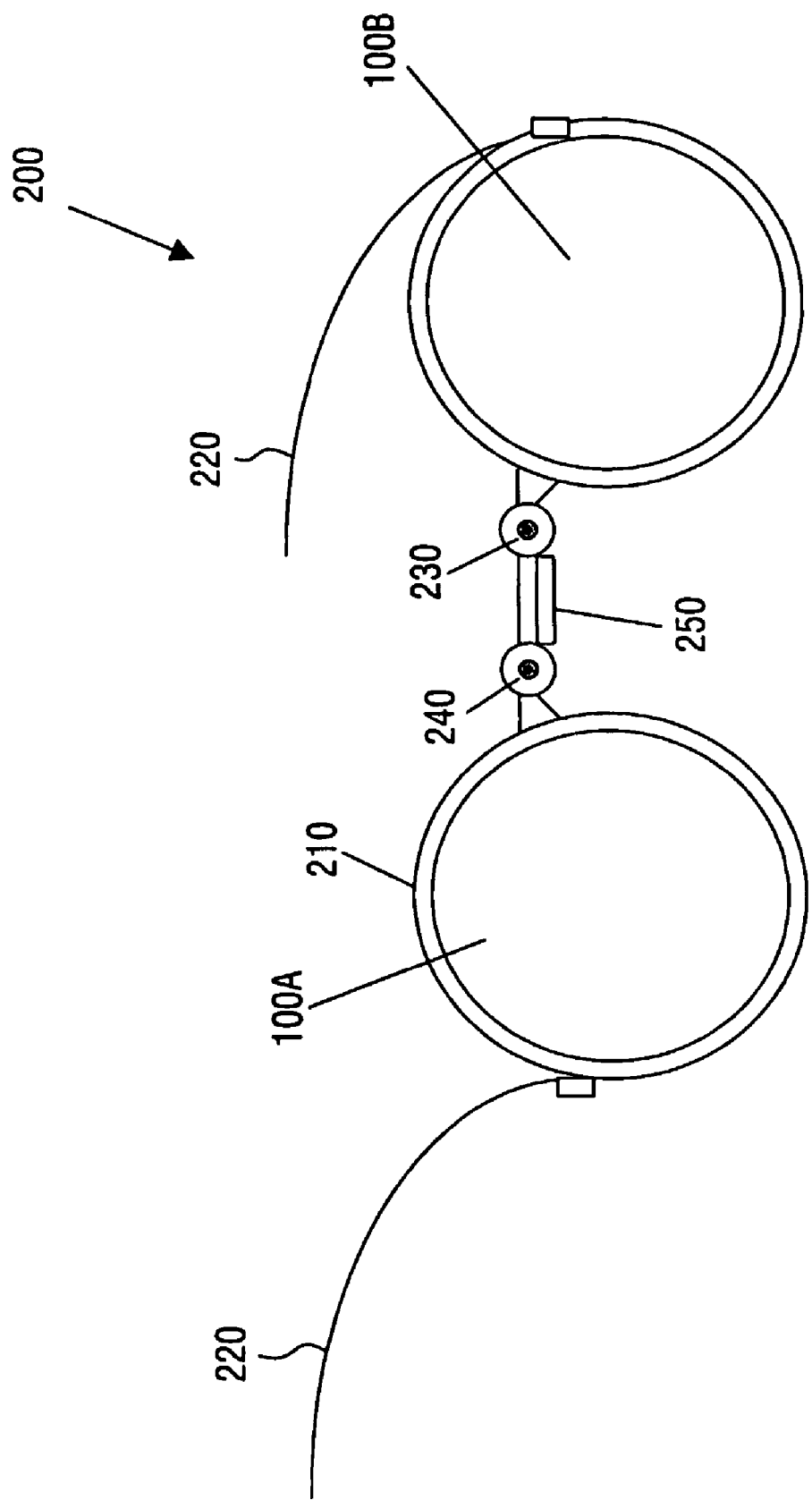
FIG. 4 shows an example of a pair of glasses incorporating lenses in accordance with FIGS. 1 through 3.

Referring now to FIG. 4, there is shown a pair of glasses 200 incorporating lenses of the type above described. The glasses 200 comprise lenses 100A, 100B, a frame 210, arms 220, a focal length determiner 230, an adjustment knob 240 and a housing 250, here shown mounted centrally on a bridge portion of the frame.

Figure 5:
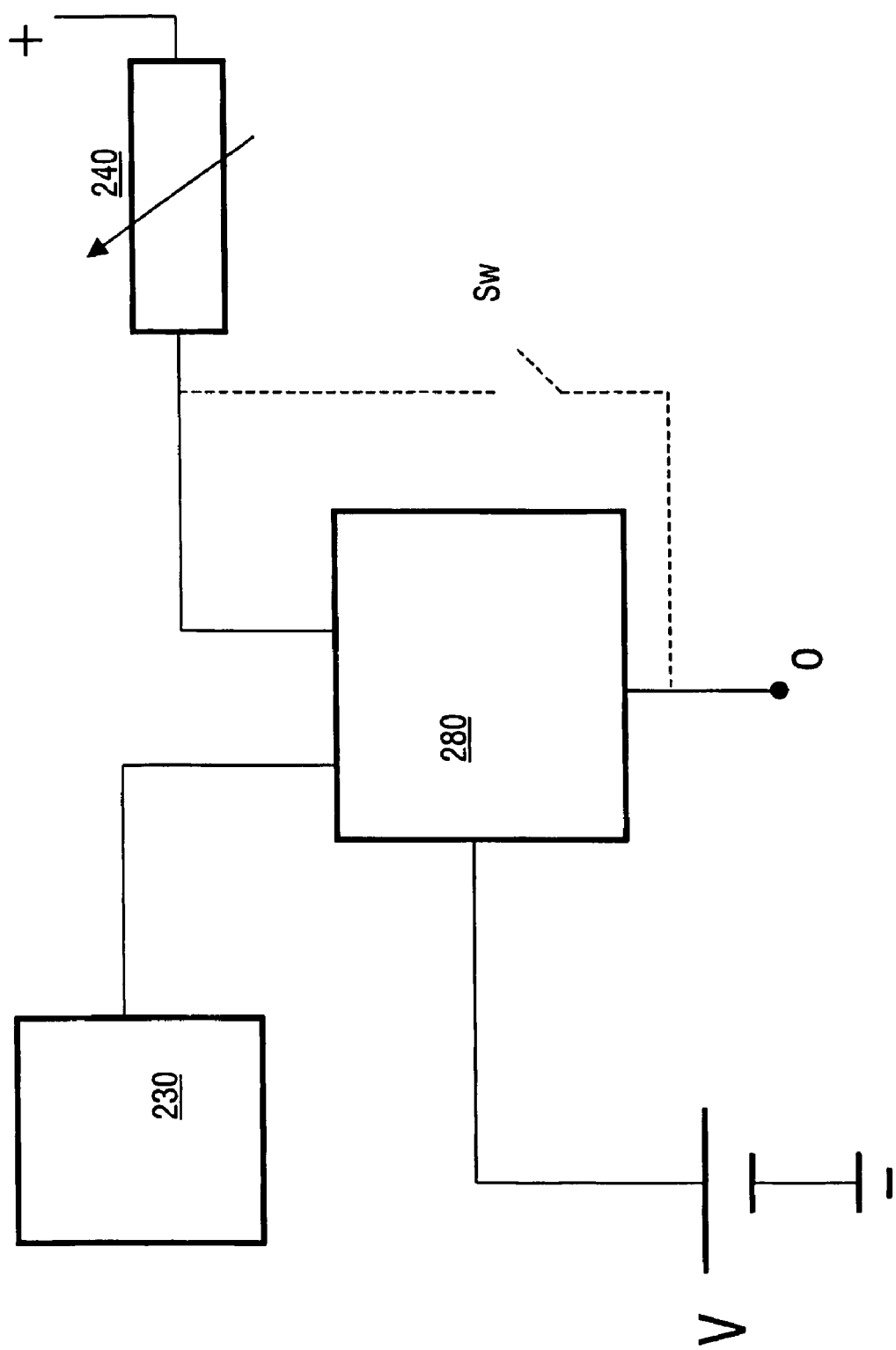
FIG. 5 is a schematic block diagram illustrating an autofocus mechanism for the glasses of FIG. 4.

Referring now to FIG. 5, there is shown a schematic diagram illustrating the interrelationship between the electronic component parts of the glasses of FIG. 4.

In FIG. 5, there is shown schematically a focal length determiner 230, adjustment knob 240, control unit 280, lens strength determiner 290 and power supply V. Here, the potential difference supplied by the voltage source may be positive, negative or AC. In the case of an AC applied voltage, the frequency thereof is arranged to be much higher than the first resonant frequency of the meniscus.

The focal length determiner 230 may comprise an infra-red unit of the type employed on auto focus cameras, or an ultrasonic unit for instance.

The lens strength determiner 290 may comprise a unit for measuring the capacitance of each lens. Here, a look-up table or the like (not shown) be employed which stores the relationship between capacitance of the lens and lens strength and provides a measure of lens strength to the control unit 280.

The focal length determiner 230, adjustment knob 240 (which may comprise a potentiometer), lens strength determiner 290 and power supply unit V are connected to the control unit 280, and the control unit 280 provides a variable output potential O to pairs of electrodes 150,160 of the lenses 100A, 100B. In a case of manual control (denoted by the dashed line [ - - - ] and manual over-ride switch "Sw"), the output of the variable potentiometer 240 may be fed directly to the output O of the control unit 280 to provide a directly user adjustable regulation of the focal length of the lenses 100A, 100B. Alternatively, in an auto focus mode, the focal length determiner 230 may sense the distance of an object that the user is presumed to be looking at. Here, for instance, where the focal length determiner 230 is an ultrasonic transducer, turning the head towards an object to be focused on may be arranged to target that object with the centrally mounted transducer 230. The reflected range finding signal from the transducer 230 is processed by the control unit 280 to determine the desired focal length of the glasses, the signal from the lens strength determiner is analyzed to check the actual lens strength and an appropriate output signal "O" is generated to supply an appropriate potential difference between electrodes 150, 160 to bring about auto-focusing. It can be checked then once again that the desired lens strength has been achieved and, if needed, the signal "O" may be adjusted.

Whilst the above describes open loop type control, it will be appreciated that closed loop feedback control for adjustment of lens strength may be provided and may be particularly useful to compensate for variations in strength encountered due to temperature changes etc.

From the above, it will be evident to the skilled man that there is described a convenient glasses arrangement by which a user may alter the focal length of their spectacles at will to avoid the need for separate pairs. Adjustment of focal length may be manual or automatic. Automatic arrangements may be simple (two focal lengths switched between according to a range finding result as to whether an object being looked at is relatively close or relatively far away) or complex (infinitely variable dependent on specific object distance) according to requirements.

Vibrations of the meniscus may be suppressed or eliminated by appropriate choice of viscosity of the fluids used. Higher viscosity gives fewer vibrations.

The above-described embodiments are non-limiting and the skilled man will realize that numerous modifications may be made without going beyond the scope of the invention.

The electrode 150 may be divided into many small electrodes perpendicular to the ring in order to create an anamorphic (e.g. cylindrical) interface. This method to make anamorphic lenses is described in filing NL021187. However, anamorphic (e.g. cylindric) compensation may also be obtained by preshaping the front and/or rear wall.

The invention claimed is:

1. Variable focus spectacles comprising a spectacle frame and at least one variable power lens, wherein said lens comprises a transparent rear wall, a transparent front wall, a cavity formed between the transparent front wall and the transparent rear wall, first and second immiscible fluids of differing refractive index contained within said cavity, and electrodes to which a potential difference may be applied to change a contact angle between an interface layer of the two fluids and the front wall of the lens.

2. The variable focus spectacles of claim 1, wherein the transparent front wall joins with the transparent rear wall at peripheral regions thereof to form an acute internal angle at their joining region.

3. The variable focus spectacles of claim 1, wherein the first and second fluids are of substantially identical specific gravity.

4. The variable focus spectacles of claim 1, wherein the electrodes comprise a ring-type electrode which extends around an internal periphery of the transparent front wall, so as to form a first electrical contact and a further electrode adjacent an internal surface of the rear wall.

5. The variable focus spectacles of claim 1, wherein the first fluid is the fluid nearest the transparent front wall, whilst the second fluid is the fluid having a boundary with the transparent rear wall and the first fluid comprises an oil, whilst the second fluid comprises an electrolyte.

6. The variable focus spectacles of claim 5, wherein the second fluid comprises a water/salt mixture having a refractive index different to the refractive index of the first fluid.

7. The variable focus spectacles of claim 1, further comprising adjustment means for adjusting the strength of an electric field to be applied between the electrodes.

8. The variable focus spectacles of claim 7, wherein the adjustment means comprises manual adjustment means.

9. The variable focus spectacles of claim 8, wherein the manual adjustment means comprises a variable resistor.

10. The variable focus spectacles of claim 7, wherein the adjustment means comprises automatic adjustment means for varying the focal length of the spectacles dependent upon a perceived distance of an object to be viewed.

11. The variable focus spectacles of claim 10, wherein the automatic adjustment means comprises a focal length determiner, a control unit and a power supply V. wherein a reflected range finding signal from the focal length determiner is processed by the control unit to determine the desired focal length of the glasses and an appropriate output signal is passed to the electrodes to bring about auto-focusing.

12. The variable focus spectacles of claim 11, wherein the focal length determiner comprises a transducer mounted on the spectacle frame.

13. The variable focus spectacles of claim 7, further comprising lens strength determining means for measuring the strength of the lenses.

14. Variable focus lens comprising a transparent rear wall, a transparent front wall, a cavity formed between the transparent front wall and the transparent rear wall, first and second immiscible fluids of differing refractive index contained within said cavity, and electrodes to which a potential difference may be applied to change a contact angle between an interface layer of the two fluids and the front wall of the lens.

* * * * *